United States Patent
Bentley et al.

(10) Patent No.: US 11,497,341 B2
(45) Date of Patent: Nov. 15, 2022

(54) TEMPERATURE SENSING AND SMART GAS COOKING

(71) Applicants: BSH Home Appliances Corporation, Irvine, CA (US); BSH Hausgeräte GmbH, Munich (DE)

(72) Inventors: Garrett Bentley, Knoxville, TN (US); Humberto Delgado, Franklin, TN (US); Brian Silva, Knoxville, TN (US); David Sumner, Jacksboro, TN (US); Tyson White, Anderson, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 567 days.

(21) Appl. No.: 16/591,661

(22) Filed: Oct. 3, 2019

(65) Prior Publication Data
US 2021/0100393 A1 Apr. 8, 2021

(51) Int. Cl.
*A47J 27/62* (2006.01)
*F24C 3/12* (2006.01)
*F23N 1/00* (2006.01)
*G01K 1/143* (2021.01)
*F23N 5/02* (2006.01)

(52) U.S. Cl.
CPC .............. *A47J 27/62* (2013.01); *F23N 1/002* (2013.01); *F23N 5/02* (2013.01); *F24C 3/126* (2013.01); *G01K 1/143* (2013.01); *F23N 2225/08* (2020.01); *F23N 2241/08* (2020.01)

(58) Field of Classification Search
CPC ...... A47J 27/62; F23N 1/002; F23N 2223/38; F23N 2225/08; F23N 5/02; F23N 5/203; F24C 3/124; F24C 3/126; G01K 1/143; G01K 2207/06

USPC .............................. 126/39 E, 39 G; 236/20 A
See application file for complete search history.

(56) References Cited

U.S. PATENT DOCUMENTS

| 5,240,725 A | * | 8/1993 | Akamatsu | G05D 23/1951 99/344 |
|---|---|---|---|---|
| 5,693,245 A | | 12/1997 | Clizbe | |
| 5,787,874 A | * | 8/1998 | Krohn | F24C 3/126 126/39 J |
| 6,554,197 B2 | * | 4/2003 | Marbach | F23N 5/022 126/374.1 |

(Continued)

FOREIGN PATENT DOCUMENTS

| CN | 201047620 Y | 4/2008 |
|---|---|---|
| CN | 203869110 U | 10/2014 |

(Continued)

*Primary Examiner* — Avinash A Savani
(74) *Attorney, Agent, or Firm* — Michael E. Tschupp; Andre Pallapies; Brandon G. Braun

(57) ABSTRACT

A gas cooktop may include: a gas burner; a sensor configured to sense temperature of a cooking container heated by the gas burner; a valve configured to control flow rate of gas from a gas source to the gas burner; and a control system including circuitry. The control system may start operation of the gas burner; receive sensor signals from the sensor indicating the temperature of the cooking container; and based on received sensor signals representing the sensed temperature of the cooking container and a cooking profile indicating one or more durations and one or more temperatures, control the valve to change the gas flow rate to the gas burner.

20 Claims, 7 Drawing Sheets

(56) References Cited

U.S. PATENT DOCUMENTS

| | | |
|---|---|---|
| 6,555,793 B2 | 4/2003 | Giiflilhs et al. |
| 6,663,009 B1 | 12/2003 | Bedetti et al. |
| 6,756,569 B2 | 6/2004 | Bates et al. |
| 7,307,246 B2 | 12/2007 | Smolenski et al. |
| 7,959,433 B2 | 6/2011 | Huff |
| 9,132,302 B2 | 9/2015 | Luongo et al. |
| 9,175,858 B2 | 11/2015 | Tisselli et al. |
| 10,092,129 B2 | 10/2018 | Jenkins et al. |
| 2002/0175213 A1 | 11/2002 | Wodeslavsky |
| 2012/0186459 A1* | 7/2012 | Tisselli .............. F24C 7/083 126/39 G |
| 2017/0205076 A1* | 7/2017 | Cadima .............. F24C 3/126 |
| 2017/0292711 A1 | 10/2017 | Wang |
| 2017/0299195 A1 | 10/2017 | Bach |
| 2020/0256563 A1* | 8/2020 | Cadima .............. F23D 14/06 |

FOREIGN PATENT DOCUMENTS

| | | |
|---|---|---|
| CN | 107607209 A | 1/2018 |
| JP | S62123224 A | 6/1987 |
| JP | 5587939 B2 | 11/2013 |
| WO | 2013111114 A1 | 8/2013 |

\* cited by examiner

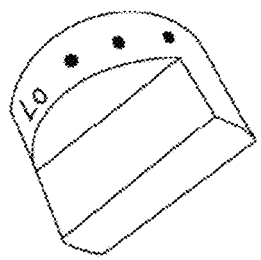
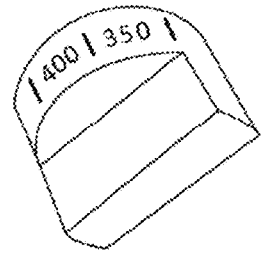
FIG. 2A  FIG. 2B
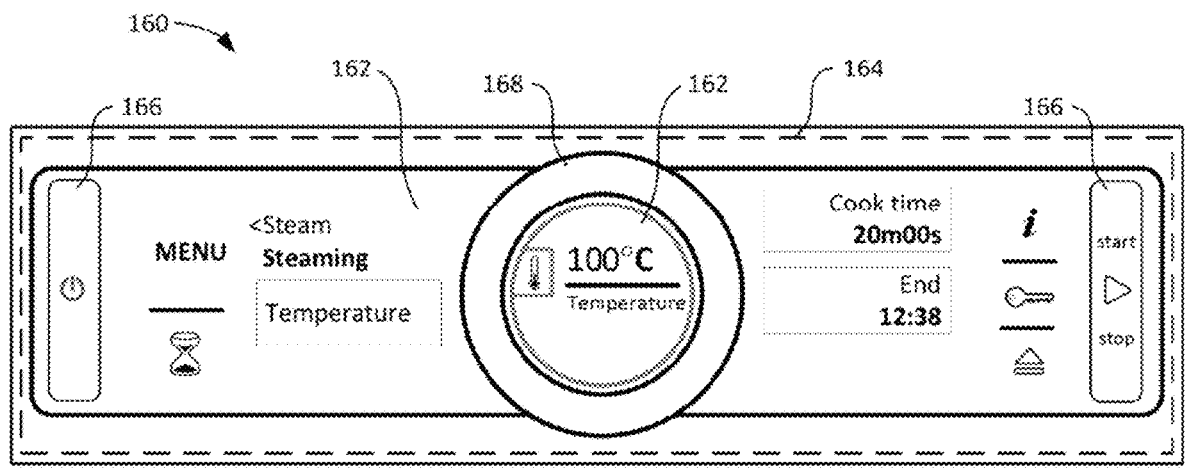
FIG. 3

TEMPERATURE SENSING AND SMART GAS COOKING

FIELD OF THE TECHNOLOGY

The present technology relates to home appliances, e.g., ranges, ovens, stoves, grills, etc., with automated cooking control based on measured temperature. The present technology further relates to smart gas cooking based on defined cooking profiles and measured temperature.

BACKGROUND

Home appliances include controls for setting appliance operating parameters. Some appliances include a timer to help users know when to adjust the operating parameters or to turn off the appliance. As an example, a knob in a gas stove allows a user to control the amount of flame output by a burner. A timer in the stove tells the user when a set time has passed so that the user can increase or decrease the output flame by adjusting the knob. In ovens, a timer can be set to turn off the oven when a time set by the user has elapsed.

Users of home appliances need additional features to be able to precisely control the cooking temperatures to achieve consistent cooking results. Conventional knobs control the amount of flame output by the burner on a stove top, but do not provide users with real time cooking information (e.g., temperatures, timing, etc.), and/or pre-set control based on desired temperatures and timing needed for precision and consistency.

BRIEF SUMMARY

One aspect of the present technology relates to a home appliance including a control system configured to control a gas burner based on temperature measurements of a cooking container.

An aspect of the present technology provides a home appliance comprising: heating element, a sensor configured to sense temperature of a cooking container heated by the heating element, and control circuitry configured to control the heating element based the sensed temperature of the cooking container and a preset temperature. The preset temperature may be part of a cooking profile or a temperature that prevents scorching of the cooking container. The heating elements may be a gas burner.

Another aspect of the present technology provides a gas cooktop comprising: a gas burner; a sensor configured to sense temperature of a cooking container; a proportional solenoid valve configured to control flow rate of gas from a gas source to the gas burner; and a control system including circuitry. The control system may be configured to receive sensor signals from the sensor indicating the temperature of the cooking container; and based on received sensor signals and preset temperature control the valve to change the gas flow rate. The preset temperature may be part of a cooking profile or a temperature that prevents scorching of the cooking container.

Another aspect of the present technology provides a cooktop with smart gas cooking. In one example, when a user prepares food (e.g., rice), the process may require different gas flow rates for certain periods of time. Examples of the present technology allow the user to select the rice mode which will change the gas flow rate based on time and/or pan temperature feedback. The power of the burner will be adjusted to the exact heating values desired using the valve (e.g., an electrically controlled proportional solenoid valve).

The present technology also allows a user to set a cook time for a surface burner, and the burner can be automatically controller to shut off at the set time. For example, of a user may want to boil water for seven minutes, the user can set the cooking temperature and time, and the control system will automatically control the burner to heat the cooking utensil to desired temperature and keep it at that temperature for the seven minutes.

Some forms of the present technology may be controlled via a user interface, such as an application controlled via or provided in a browser, smart phone, and/or home automation system.

Another aspect of the present technology provides gas cooktop comprising: a gas burner; a sensor configured to sense temperature of a cooking container heated by the gas burner; a valve configured to control flow rate of gas from a gas source to the gas burner; and a control system including circuitry. The control system may be configured to: start operation of the gas burner; receive sensor signals from the sensor indicating the temperature of the cooking container; and based on received sensor signals representing the sensed temperature of the cooking container and a cooking profile indicating one or more durations and one or more temperatures, control the valve to change the gas flow rate to the gas burner.

In examples, the gas cooktop can include one or more of the following features: (a) controlling the valve includes controlling the valve to increase the flow rate of the gas to the burner when a temperature defined by the cooking profile is higher than the temperature of the cooking container represented by the received sensor signals; (b) controlling the valve includes controlling the valve to decrease the flow rate of the gas to the burner when the temperature defined by the cooking profile is lower than the temperature of the cooking container represented by the received sensor signals; (c) the control system is configured to control the valve to reduce the flow rate of gas to the burner when the received sensor signals correspond to a preset temperature at which the cooking container is scorched; (d) an input controller comprising a knob, the input controller configured to set, based on a user controlling the knob, a surface temperature for the cooking container placed on the grate; (e) the knob includes a digital display configured to show a cooking container surface temperature determined by the control system based on the received sensor signals from the sensor, and/or the temperature set by the knob; (f) controlling the valve includes shutting off the valve when an end of the cooking profile is reached; (g) the cooking profile identifies a first and a second temperature, a first duration for the first temperature, and a second duration for the second temperature; (h) the control system comprises a processor and a voltage regulator coupled to the valve and the voltage regulator receives signals from a processor for controlling the valve; (i) the sensor includes a capillary tube and a thermal sensing device disposed at one end of the capillary tube; (j) the sensor is coupled to the grate and extends above the gas burner; (k) the sensor is positioned above the gas burner; (l) an end of the sensor is centered on the burner and positioned above the gas burner; (m) a communication device configured to communicate with a mobile device and/or a home automation system; (n) the control system configured to receive the cooking profile from the mobile device and/or the home automation system; (o) the control system configured to transmit, to the mobile device and/or the home automation system, progress of controlling the valve according to the cooking profile; (p) a control panel, and the control system is further configured to define the one or more durations and the one or more temperatures based on user inputs received via the control panel; (q) the valve is a proportional solenoid valve; and/or (r) a grate disposed around the gas burner, wherein the cooking container is placed on the grate.

Another aspect of the present technology provides gas cooktop comprising: a plurality of gas burners; a grate disposed above an upper portion of the plurality of gas burners; a plurality of temperature sensors, each temperature sensor disposed above a corresponding gas burner and configured to abut a bottom surface of a cooking container when the cooking container is placed on the grate above the corresponding gas burner; a plurality of proportional solenoid valves, each valve configured to control flow rate of gas from a gas source to the corresponding gas burner; and a control system including one or more processors. The control system may be configured to: receive user input specifying a cooking profile and assigning the cooking profile to a selected gas burner of the plurality of gas burners, the cooking profile including a first temperature, a first duration for the first temperature, a second temperature, and a second duration for the second temperature; while operation of the selected gas burner during the first duration and the second duration, receive, from the temperature sensor associated with the selected burner, sensor signals indicating a surface temperature of the cooking container heated by the selected gas burner; during the first duration, control the valve to increase the flow rate when the surface temperature of the cooking container is below the first temperature and decrease the flow rate when the surface temperature of the cooking container is above the first temperature; and during the second duration, control the valve to increase the flow rate when the surface temperature of the cooking container is below the second temperature and decrease the flow rate when the surface temperature of the cooking container is above the second temperature.

In some examples, the control system may be configured to receive, from a mobile device or home automation system, a cooking profile for one or more burners.

BRIEF DESCRIPTION OF THE DRAWINGS

The accompanying drawings facilitate an understanding of the various examples of this technology. In such drawings:

FIG. 2A shows a knob for controlling a burner according to one form of the present technology;

FIG. 2B shows a knob for controlling a burner according to another form of the present technology;

FIG. 3 shows an input controller according to one form of the present technology;

DETAILED DESCRIPTION

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

The present technology describes cooking system configured to improve cooking performance and precision by sensing surface cooking temperature and controlling a heat source (e.g., gas flow in a burner) to achieve desired cooking results. The cooking system may include home appliances such as a range, oven, stove, and/or grill including one or more burners configured to heat a cooking container (e.g., pan, pot, etc). The home appliance may include a control system configured to receive information about surface cooking temperature and control gas flow in a burner to prevent scorching of cooking containers and/or provide smart gas cooking based on desired cooking profiles.

Figure 1:
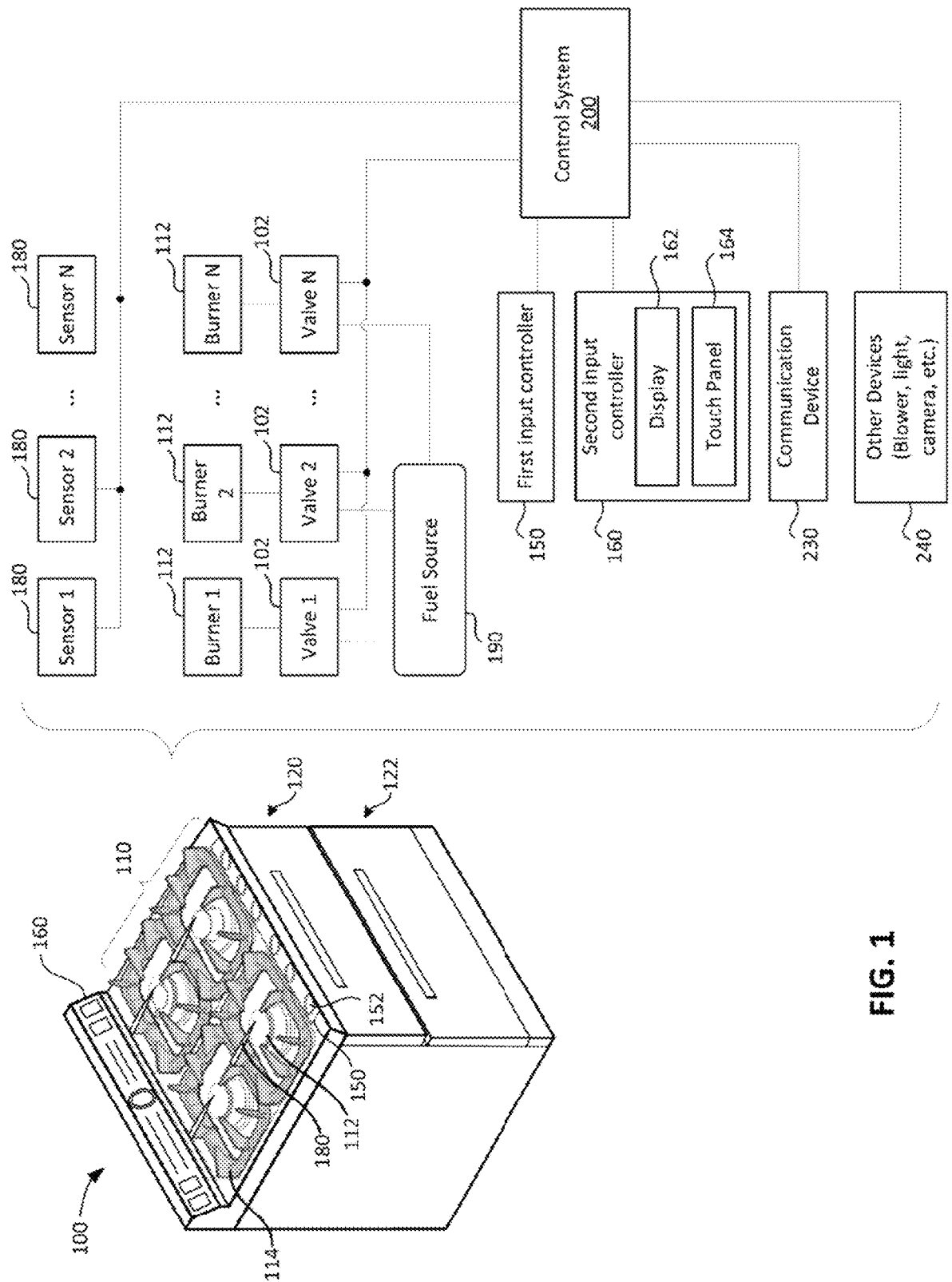
FIG. 1 shows a home appliance in accordance with one form of the present technology.

FIG. 1 shows a home appliance 100 in accordance with one form of the present technology. The appliance 100 may include a cooktop 110, one or more cooking chambers 120 and 122, and one or more input controllers 150 and 160. The cooktop 110 may include one or more burners 112, a grate disposed around the burners 112, and one or more sensors 180 disposed near the burners 112.

The cooktop 110 is shown with four independently controlled burners 112 configured to receive gas from a fuel source 190. The fuel source 190 may include a gas storage container provided inside or outside of the appliance 100 and/or may receive gas from an external source. Each of the burners 112 may be coupled to a respective valve 102 configured to control the gas flow to the burners 112. In some examples, more than one valve may control the supply to a single burner 112. One or more of the burners 112 may comprise a multi ring burner including a plurality of rings, each controlled by a different valve 102 or a same valve 102.

The one or more cooking chambers 120 and 122 may include one or more burners 112 configured to heat items placed inside the cooking chambers. The burners 112 used to heat the one or more cooking chambers 120 and 122 may also receive gas from the fuel source 190 and respective valves 102 may control the gas flow to the burners 112 heating the one or more cooking chambers 120 and 122. In one example, the one or more burners 112 on the cooktop 110 and/or the cooking chambers 120 and 122 may be replaced with another heat source (e.g., electric heating elements).

The appliance 100 may include sensors 180 located near the burners 112 of the cooktop 110. The sensor 180 near the corresponding burner 112 is configured to monitor surface temperature of a cooking container (e.g., pan, pot, kettle, etc.) placed on a grate 114 around the burner 112. In some examples of the present technology, the sensor 180 is coupled to the grate 114 and/or a top surface of the cooktop 110 such that the sensor 180 is in contact with a bottom of the cooking container when the cooking container is placed on the grate 114. Upon contact with the bottom of the cooking container, the sensor 180 senses the temperature of the bottom of the cooking container. As will be discussed in more detail below, the temperature can be used to control gas output by the burner 112 to increase and/or decrease the temperature of the cooking container.

The first input controller 150 and/or the second input controller 160 may be used to control operation of the appliance 100. The first input controller 150 and/or the second input controller 160 may be coupled to the control system 200, transmit control signals to the control system 200, and/or receive data (e.g., display data, measured temperatures etc.) from the control system 200.

In the example illustrated in FIG. 1, a first input controller 150 includes a plurality of knobs 152 for controlling the burners 112 on the cooktop 110 and in the cooking chambers 120 and 122. The knobs 152 may also control ignition (e.g., electric ignition using a hot surface or glob bar ignitor). In some examples, a knob 152 may mechanically adjust a valve 102 controlling supply of gas to a burner 112. In other examples, a knob 152 may set a voltage, directly or via a control system 200, for controlling a solenoid valve or the respective burner 112. In some examples, the knob 152 may set a setting for the burner 112 and another component (e.g., control system 200) may control one or more valves associated with a burner 112. The knob may be configured to output a varying voltage value or digital signal to indicate a setting of the knob. Accordingly, the first input controller 150 may be coupled to the valves 102 directly and/or via the control system 200.

FIGS. 2A and 2B show examples of knobs that may be used for controlling the burners 112. In FIG. 2A, a knob is shown which can be used to adjust a level of gas output by a burner 112. The level of gas output can be set to low, medium, high, or levels in between low, medium, and high. In FIG. 2B, a knob is shown with specific temperature settings, which can be used to set a temperature level desired for a surface temperature of a cooking container heated by a burner 112. A difference between the set surface temperature and a surface temperature of a cooking container measured by a sensor 180 can be used to control the valve 102 providing gas to a burner 112 on the cooktop 110. The knob shown in FIG. 2B and associated control system can allow the end user to know the true cooking temperature of the cooking surface. By controlling the cooking temperature rather than high low, consumers can cook their desired meals precisely and prevent burning.

In some examples, the appliance 100 may provide a control to selectively control operation of the burner based on the desired gas output level (e.g., as shown in FIG. 2A) or the desired surface temperature of a cooking container (e.g., as shown in FIG. 2B). In this example, the first or second input controller may include a switch, button, or setting in a user interface to switch between the knob controlling gas output level and desired surface temperature. When the knob is used to set gas output level, the valve may be adjusted to provide the set gas flow rate corresponding to the set gas output level. When the knob is used to set desired surface temperature, the valve may be automatically adjusted by the control system to increase or decrease the gas flow rate based on the difference between the set desired surface temperature and surface temperature measured by the sensor.

The second input controller 160 may include a control panel providing a user interface for controlling operation of the cooktop 110, cooking chambers 120 and 122, and/or other devices (e.g., a blower, lights, a camera, etc.). The second input controller 160 may be provided in addition to or in place of the first input controller 150. In some examples, the functionality of the first input controller 150 may be provided by the second input controller 160.

FIG. 3 shows a second input controller 160 according to one form of the present technology. The second input controller 160 may include a display 162, a touch panel 164, and/or one or more physical controls 166 (e.g., switches, buttons, and/or knobs). The display 162 may include a single or a plurality of separate displays and/or the touch panel 164 may be overlapped by one or more of the displays. The control system 200 may provide data for display on the display(s) and receive signals from the touch panel 164 in response to user inputs.

The second input controller 160 may include one or more circular control devices 168 for controlling the setting of the appliance 100. The circular control device 168 may be rotatable or include an outward rotating ring. The circular control device 168 or the outward ring can be rotated (e.g., to the right or left), receive an inward click, receive an outward pull, and/or be manipulated left, right, up and/or down. As shown in FIG. 3, the circular control device 168 may include a display inside of the ring for displaying information about operation of the appliance 100.

In one example, the circular control device 168 may be selected to control a specific burner 112 and display surface cooking temperature determined from signals received from a sensor 180 associated with the specific burner 112, and/or a surface cooking temperature set by a user (e.g., via the knob). The rotating ring may be controlled (e.g., rotated) to change the desired surface temperature of the cooking container heated by the specific burner 112. In some examples, the circular control device 168 can be provide separate from the second input controller 160. For example, a circular control device 168 can be provided for one or more burners 112 of the cooktop 110 in the first input controller 150 or another portion of the appliance 100.

In some examples, the second input controller 160 may be a touch input display and one or more of the physical controls 166 and/or the circular control device 168 may be displayed on the display and controlled based on a touch input.

The second input controller 160 may allow Smart Gas Cooking providing an ability create and/or select a cooking profile to cook a desired dish. The profiles and the feedback provided from the sensors 180 allow for the user to be able to prepare a perfect dish consistently.

Figure 4A:
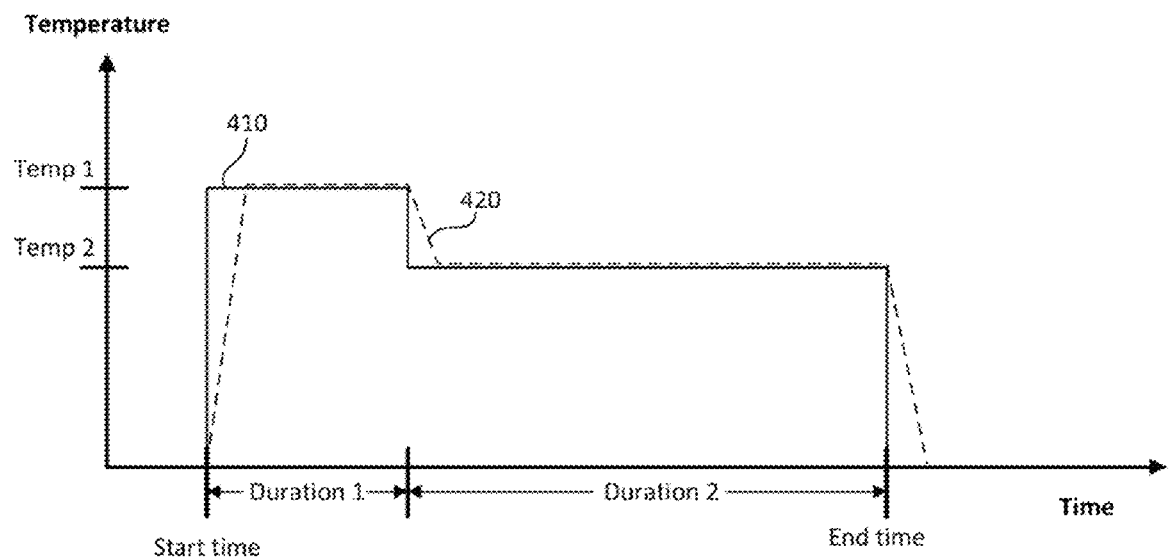
FIG. 4A shows a cooking profiles that may be defined by a user and/or pre-stored in the appliance or another device according to one form of the present technology.
Figure 4B:
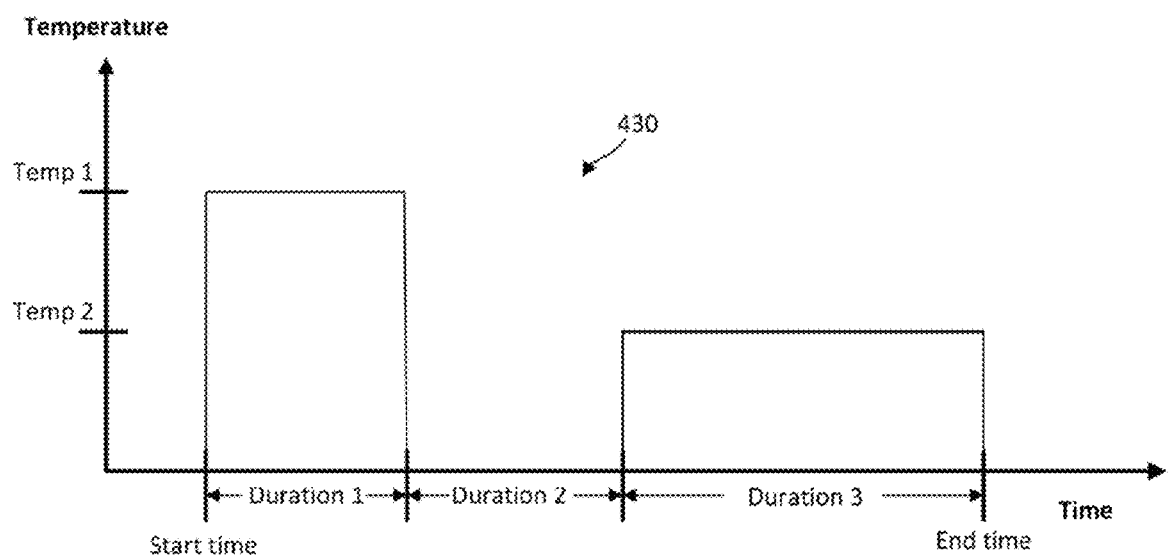
FIG. 4B shows a cooking profiles that may be defined by a user and/or pre-stored in the appliance or another device according to another form of the present technology.

The cooking profile may define start time, duration, end time, gas flow rates, and/or desired temperate settings for the surface temperature of the cooking container. FIGS. 4A and 4B show example cooking profiles that may be defined by a user and/or pre-stored in the appliance or another device (e.g., a mobile device). To create a cooking profile 410 shown in FIG. 4A, the user may use the second input controller 160 to select (1) a first surface temperature and a first duration defining how long the first surface temperature should be maintained, and (2) a second surface temperature and a second duration at which the second surface temperature should be maintained.

To create a cooking profile 430 shown in FIG. 4B, the user may use the second input controller 160 to select (1) a first surface temperature and a first duration defining how long the first surface temperature should be maintained, (2) a second duration during which the burner is turned off, and (2) a second surface temperature and a third duration at which the second surface temperature should be maintained. In some examples, the control system 200 may determine the second duration based the user specifying for the surface temperature to drop to a predetermined value and the measured surface temperature.

After the profile is selected or defined, the user can select an input to start controlling the burner 112 according to the defined or selected profile. The second input controller 160 may display a cook time and/or end time based on the selected profile and progress. In some examples, the user may define a start time or a stop time and the control system 200 may control operation of the burner so that the burner is controlled according the profile while satisfying the set start time or stop time.

The control system 200 may control operation of the burner 112 by turning on, turning off, increasing gas flow rate, and/or decreasing the gas flow rate to provide the defined or selected profile. In some examples, the control system 200 may simultaneously control a plurality of different valves and/or burners based on a same or different cooking profile.

FIG. 4A show a measured temperature profile 420 representing temperature over time that may be measured by the sensor 180. The measured temperature profile 420 may have variations from the profile 410 due to time it takes for the cooking container to heat up or cool down in response to turning on, turning off, increasing gas output, and/or decreasing the gas output.

The control system 200 includes circuitry and/or software elements configured to control operation of the appliance 100. The control system 200 may include processors, microprocessors, circuits, circuit elements (e.g., transistors, resistors, capacitors, inductors, and so forth), integrated circuits, application specific integrated circuits ("ASIC"), programmable logic devices ("PLD"), digital signal processors ("DSP"), field programmable gate array ("FPGA"), logic gates, registers, semiconductor device, chips, microchips, and/or chip sets. As shown in FIG. 1, the control system 200 can receive and/or send signal or data to/from the sensors 180, controls valves 102, the first input controller, the second input controller, communication device 230 and/or other devices 240.

Figure 5:
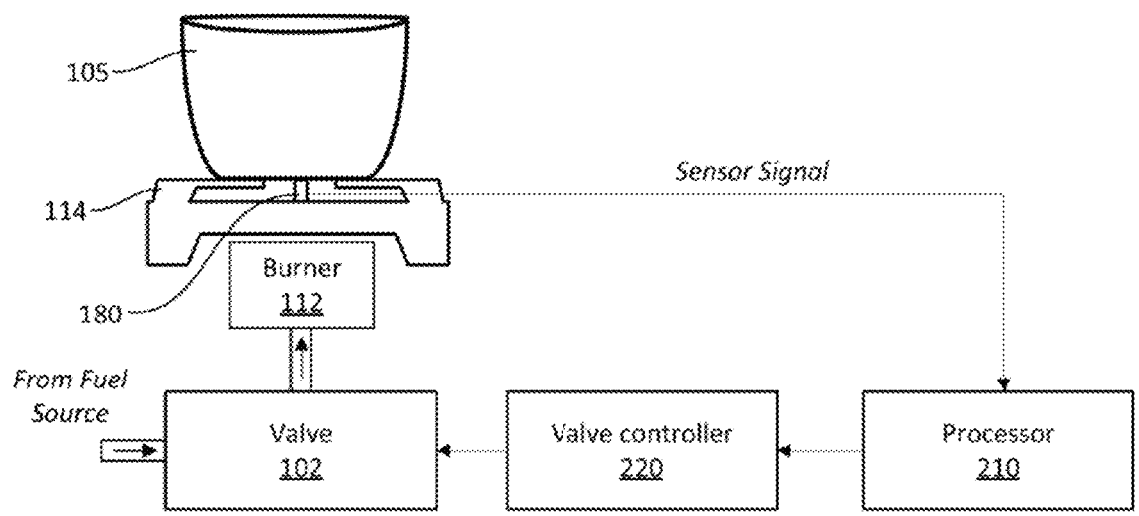
FIG. 5 shows a control system for controlling a burner according to one form of the present technology.

FIG. 5 shows a control system 200 for controlling a burner 112 according to one form of the present technology. The control system 200 may include a processor 210 and a valve controller 220. The processor 210 may control a valve 102, coupled between a fuel source and the burner 112, via the valve controller 220. The valve 102 may be a proportional solenoid valve configured to control the gas flow rate based on an input voltage. The valve controller 220 may include a voltage regulator and/or a digital to analog converter configured to output a voltage within an operable range used by the valve 102.

In one example, the processor 210 may send a low voltage signal or a digital signal to the valve controller 220. The voltage regulator in the valve controller 220 may be configured to receive the low voltage signal (e.g., between 0 and 5V) and output a proportional voltage within an operable range of the valve 102. The digital to analog converter in the valve controller 220 may be configured to receive the digital signal and output a proportional voltage within the operable range of the valve 102, or provide a low voltage signal to a voltage regulator. In some examples, the valve controller 220 may be provided as part of the valve 102.

The processor 210 may receive signals from the sensor 180 indicating a surface temperature of a cooking container 105 placed on the grate 114 and heated by the burner 112. Based on the received sensor signals and desired surface temperatures set by a user or defined by a cooking profile, the processor 210 may automatically adjust the output low voltage signal or digital signal to the valve controller 220. If the received sensor signal indicates that the actual surface temperate is lower than the set surface temperatures, the processor may send a digital signal or voltage signal that will increase the gas output by the valve 102. If the received sensor signal indicates that the actual surface temperate is higher than the set surface temperatures, the processor may send a digital signal or voltage signal that will decrease the gas output by the valve 102. In some examples, the control system 200 may include closed loop control system configured to control the valves 102 based on the measured and set surface temperatures.

In one form of the present technology, the control system 200 may be configured to control the valve 102 to reduce the flow rate of gas to a burner 112 when the received sensor signals correspond to a preset temperature at which the cooking container is scorched. The preset temperature may be set by a user. In some examples, a user may select the type of cooking container (e.g., size, shape, weight, material, brand etc.) that is being used and the control system 200 may set the preset temperature based on the type of cooking container.

The sensor 180 may include a thermistor, a resistance temperature detector (RTD) element, a semiconductor sensor, and or other thermal sensing device configured to measure a surface temperature of the cooking container 105. The thermistor may include a thermally sensitive resistor exhibiting a predictable and precise change in resistance correlated to variations in temperature of the cooking container 105. The RTD sensor may be configured to measure temperature by correlating the resistance of an RTD element with temperature of the cooking container 105.

The sensor 180 may include a capillary tube extending from a top surface of the cooktop 110 such that the sensor 180 is in contact with the bottom surface of the cooking container 105. FIG. 5 shows a sensor 180 extending from the top surface of the cooktop 110 and abutting the bottom surface of the cooking container 105. The sensor 180 may be positioned such that the thermal sensor is provided approximately in the middle of the burner and/or the grate 114.

Figure 6:
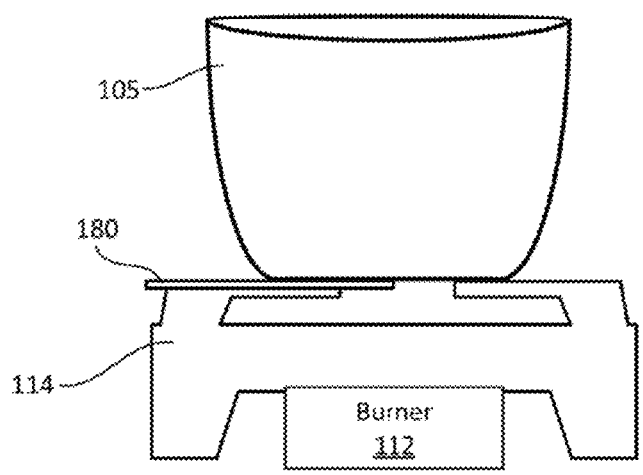
FIG. 6 shows a burner and sensor configuration according to one form of the present technology.

FIG. 6 shows capillary tube of the sensor 180 provided adjacent to a side member of the grate 114 and extending to approximately the middle of the burner and/or the grate 114. The sensor 180 is positioned such that a thermal sensing device at the end of the capillary tube is in contact with the bottom surface of the cooking container 105. The sensor 180 may be provided such that it extends past an end of the side member of the grate 114. In some examples, the sensor 180 may be coupled to the grate 114.

In some examples, the sensor 180 may be positioned such that the thermal sensor is positioned away from the center of the burner to measure the bottom surface of the cooking container 105 near an edge of the cooking container 105. In other examples, the sensor 180 may be configured to measure a side surface of the cooking container 105 near the bottom of the cooking container 105. The positioning of the sensor 180 may be adjustable to allow the user to position the sensor 180 against the bottom and/or side surface of the cooking container 105.

Figure 7:
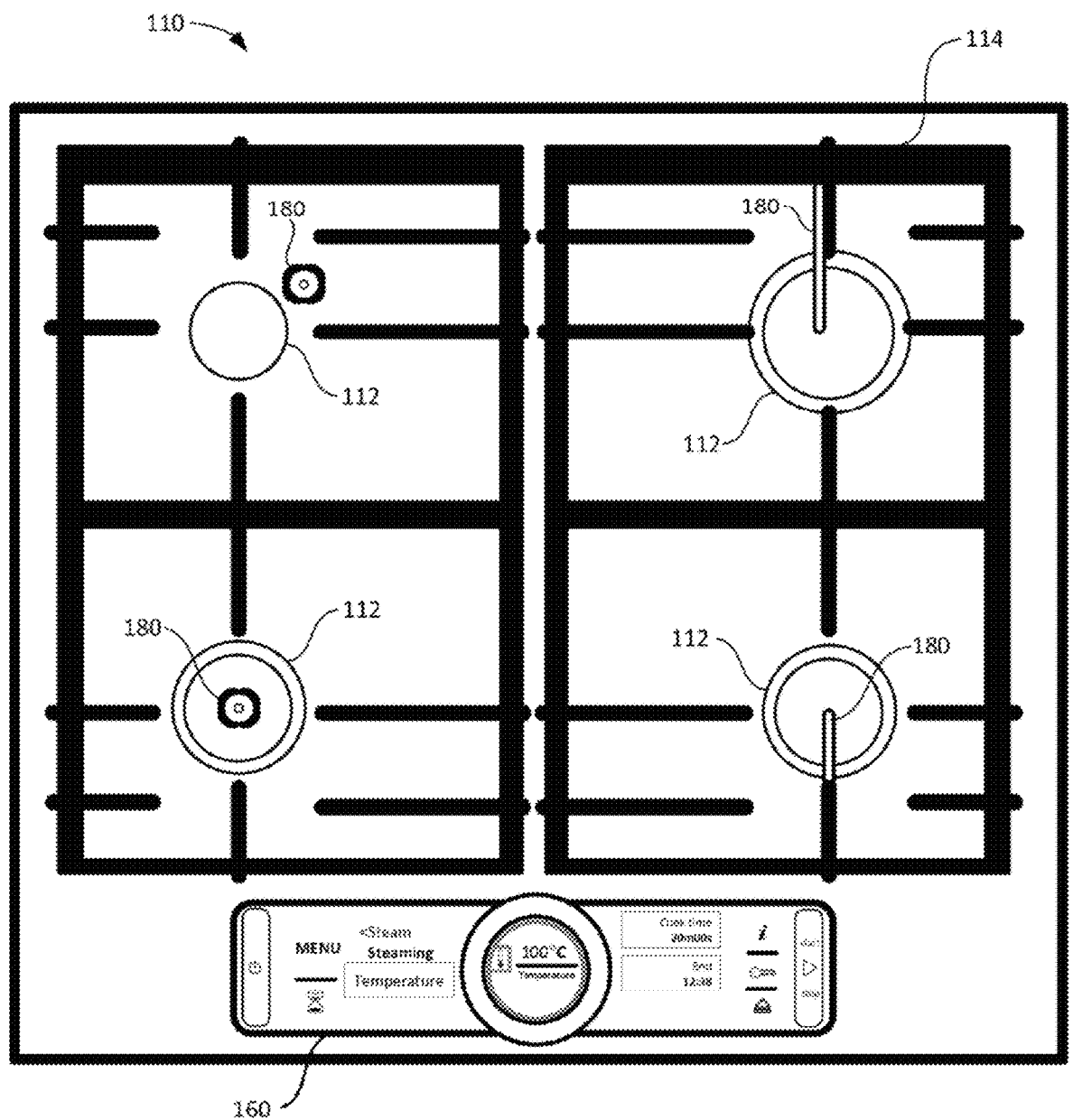
FIG. 7 show a cooktop according to one form of the present technology.

FIG. 7 show a cooktop 110 according to one form of the present technology. In the example shown in FIG. 7, an input controller 160 is provided to control operation of the burners 112. The input controller 160 can be provided on a common surface with the burners 112 and/or the grate 114. As shown in FIG. 7 one or more sensors 180 may be provided extending from the surface of the cooktop 110 adjacent to the burner 112, extending from a burner 112 in the center of the burner, adjacent to and parallel to a member of the grate 114, and/or extending from a member of the grate 114.

Figure 8:
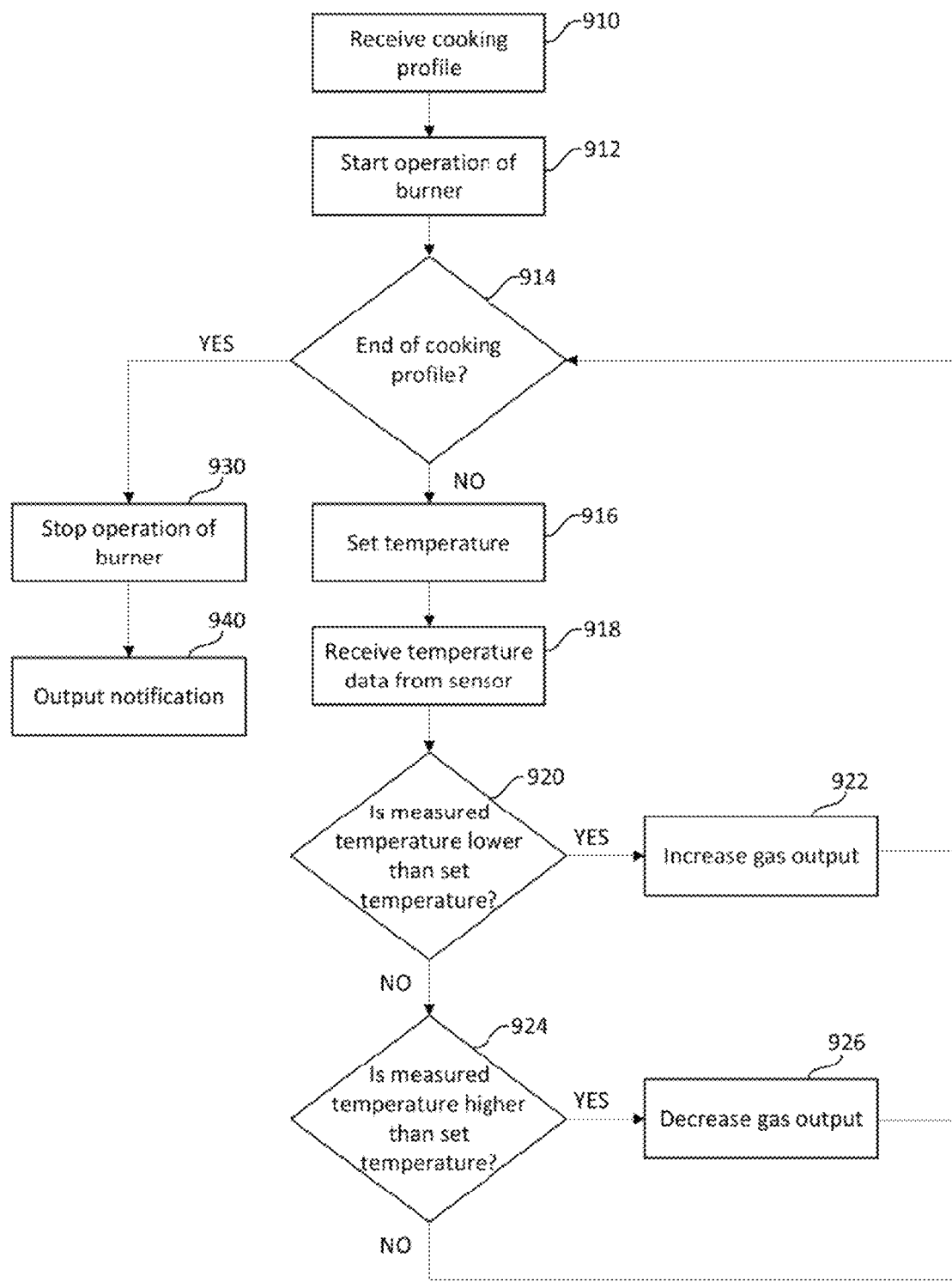
FIG. 8 shows a flow diagram of the operations that may be performed by a control system according to one form of the present technology.

FIG. 8 shows a flow diagram of the operations that may be performed by a control system 200 according to one form of the present technology. In step 910, the control system 200 may receive a cooking profile. The cooking profile may be received by a user selecting the cooling profile from a list of predefined cooking profile (e.g., stored in memory of the control system 200), or defining a cooking profile by selecting cooking temperatures, start time, end time, durations, and/or burners.

Based on the received cooking file, the control system 200 will start operation of the burner (step 912). The operation may be started by automatically controlling an associated valve to provide gas to the selected burner and igniting the burner. In some examples, a user may ignite the burner and/or select "start" to start operation of the burner according to the selected cooking profile.

In step 914, a determination is made if the end of the cooking profile has been reached. If the end of the cooking profile has been reached (YES in step 914), the operation of the burner can be stopped (step 930). The operation of the burner can be stopped by controlling the valve to stop providing gas to the selected burner.

If the end of the cooking profile has not been reached (NO in step 914), a temperature for the surface of the cooking container can be set based on the cooking profile (step 916). In step 918, signals from the temperature sensor are received. The signals from the temperature sensor may provide temperature of a bottom surface of the cooking container. The control system may determine the temperature based on the signals received from the sensors.

In step 920, a determination is made as to whether the measured temperature is lower than the set temperature. If the measured temperature is lower than the set temperature, then the gas output at the burner may be increased (step 922) by controlling the associated valve. The valve may be controlled such that the flow rate of the gas is increased based on the difference between the measured temperature and the set temperatures. A greater temperature difference will generate a greater increase in gas flow rate and a smaller temperature difference will generate a smaller increase in the gas flow rate. If the temperature difference is over a predetermined value, the control system 200 may control the valve to fully open to provide the maximum gas flow rate to the burner.

In step 924, a determination is made as to whether the measured temperature is higher than the set temperature. If the measured temperature is higher than the set temperature, then the gas output at the burner may be decreased (step 926) by controlling the associated valve. The valve may be controlled such that the flow rate of the gas is decreased based on the difference between the measured temperature and the set temperatures. A greater temperature difference will generate a greater decrease in gas flow rate and a smaller temperature difference will generate a smaller decrease in the gas flow rate. If the temperature difference is over a predetermined value (which may be the same of different from the predetermined value used in step 922), the control system 200 may control the valve to fully close to stop the flow of gas to the burner, or to a minimum value at which the burner is still operational.

After the increase or decrease in the gas output (step 922 or step 926), the control system 200 may determine if the end of the cooking profile has been reached in step 914. Based on the determination in step 914, the control system 200 may proceed to repeat steps 914-926 or proceed to stop operation of the burner in step 930.

After the end of the cooking profile has been reached (YES in step 914), the control system may output a notification to indicate completion of the cooking profile. In some example, the notification may be output to a mobile device and/or a home automation system.

In some examples, before the operation of the burner is stopped in step 930, the control system 200 may be configured to keep cooking container warm at a predetermined temperature for a predetermined period of time. This option may be defined in the cooking profile and/or selected by the user when the profile of selected and/or initiated.

Examples of the present technology provide for monitoring of cooking container surface temperature and automatically adjusting gas flow to a burner based on difference between the set and measured surface temperatures. Accordingly, the system can automatically adapt to changes in the content (solids or liquids) placed into the cooking container. For example, when produce is added to a cooking container containing boiling water, the temperature of the water may drop to a level below a set temperature level. When the temperature difference is detected, the control system 200 can automatically adjust the burner to bring the temperature of the water back the set temperature.

In one example, when a user prepares rice, the process may require different gas flow rates for certain periods of time. Examples of the present technology allow the user to select the rice mode which will change the gas flow rate based on time and/or pan temperature feedback. The power of the burner will be adjusted to the exact heating values desired using the valve (e.g., an electrically controlled proportional solenoid valve).

The present technology also allows a user to set a cook time for a surface burner, and the burner can be automatically controller to shut off at the set time. For example, of a user want to boil water for seven minutes, the user can set the cooking temperature and time, and the control system will automatically control the burner to heat the cooking utensil to desired temperature and keep it at that temperature for the seven minutes.

Some examples of the present technology may automatically control the burner to prevent scorching of the cooking container. In this example, the user may set a gas flow rate for a burner and the control system may monitor the container surface temperature. The control system may reduce the gas flow rate when a determination is made that scorching of the cooking container is possible. In some examples, a control system may control a first valve to provide a gas flow rate set by the user (e.g., via a knob shown in FIG. 2A). When a temperature is detected that may cause scorching of the cooking containers, the control system may control a second valve provided between the fuel source and the first valve to reduce the flow rate of gas to the burner.

Figure 9:
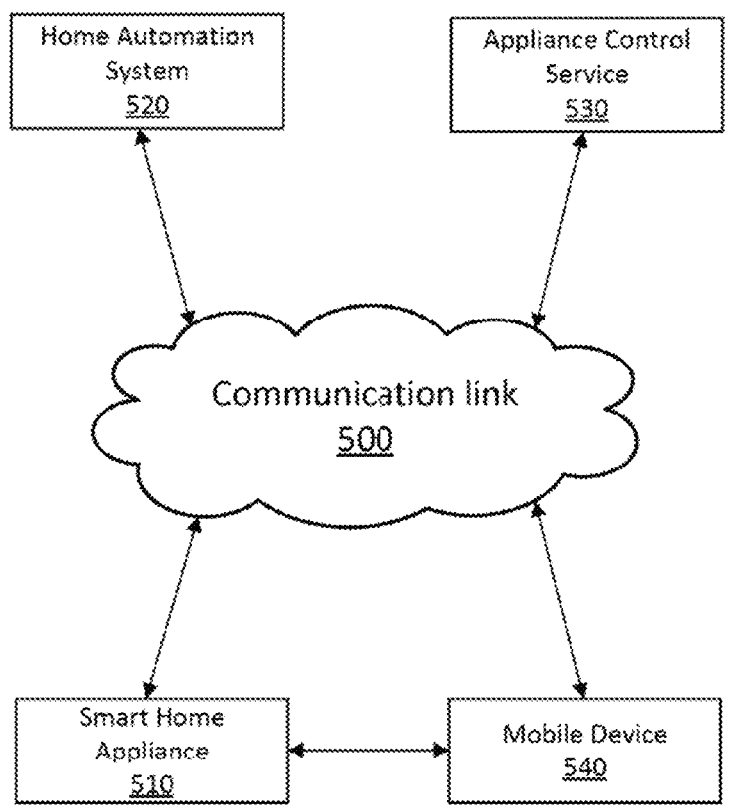
FIG. 9 shows devices connected via a communication link according to one form of the present technology.

Some forms of the present technology may be controlled via a user interface provided by an application controlled via or provided in a browser, smart phone, and/or home automation system. FIG. 9 shows devices that may be connected via a communication link 500 for controlling a smart home appliance according to one form of the present technology.

A smart home appliance 510, which may include appliance 100 and/or the cooktop 110 described in this application, may be coupled to a home automation system 520, appliance control service 530, and/or mobile device 540 via the communication link 500. The smart home appliance 510 may include a communication device 230 for communication with the other devices. The communication device 230 may provide for wireless and/or wired communication via the communication link 500.

The home automation system 520 and the mobile device 540 communicate with the smart home appliance 510 to control operation of the smart home appliance 510 and receive operational information from the home automation system 520. The home automation system 520 and/or the mobile device 540 may include an application allowing for: selecting and/or defining cooking profiles, setting operational parameters (e.g., time and/or temperatures) for specific burners, starting or stopping operation of specific burners, receiving operational parameters (e.g., burner settings, surface temperature measurements etc.), and/or receiving cooking profile progress information.

The home automation system 520 and/or the mobile device 540 may allow a user to receive notifications when conditions relating to operation of the appliance are satisfied. For example, the user may select to receive a notification when the temperature of the cooking container reaches a preset value and/or when the cooking container has been at a specific temperature for a desired amount of time. In some examples, the home automation system 520 and/or the mobile device 540 may receive images from a camera disposed above and/or inside of the smart home appliance 510.

The home automation system 520 and/or the mobile device 540 may include an application providing a user interface that corresponds to the second input controller 160 shown in FIG. 3.

The smart home appliance 510, home automation system 520 and/or the mobile device 540 may be configured to communicate with an appliance control service 530 via the communication link. The appliance control service 530 may provide predefined cooking profiles, recipes with cooking profiles for the specific home appliance, software updates for the home appliance, and service related assistance.

The communication link 500 may be a network. The network may include: an internet, such as the Internet; an intranet; a local area network (LAN); a wide area network (WAN); an internal network, an external network; a metropolitan area network (MAN); a body area network (BAN); and a combination of networks, such as an internet and an intranet. The network may be a wireless network (e.g., radio frequency waveforms, free-space optical waveforms, acoustic waveforms, etc.) and may include portions that are hard-wired connections (e.g., coaxial cable, twisted pair, optical fiber, waveguides, etc.).

In some examples, the smart home appliance 510, home automation system 520 and/or the mobile device 540 may communicate directly via a wired or wireless connection (e.g., Bluetooth, Wi-Fi Direct, etc.).

While the examples of the present technology are described with reference to cooktop including gas burners, one or more aspects of the present technology can be applied to cooktops with other types of heating sources (e.g., electric heat source).

Various examples of the present technology may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits ("ASIC"), programmable logic devices ("PLD"), digital signal processors ("DSP"), field programmable gate array ("FPGA"), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces ("API"), instruction sets, computing code, computer code, code segments, computer code segments, words, values, symbols, or any combination thereof.

Some examples of the present technology may be implemented, for example, using a non-transitory computer-readable medium or article which may store an instruction or a set of instructions that, if executed by a machine, may cause the machine to perform a method and/or operations in accordance with the examples of the present technology. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While the technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the disclosure. Also, the various examples described above may be implemented in conjunction with other examples, e.g., aspects of one example may be combined with aspects of another example to realize yet other examples. Further, each independent feature or component of any given assembly may constitute an additional example of the present technology.

Although the processes illustrated and described herein include series of steps, it will be appreciated that the different examples of the present technology are not limited by the illustrated ordering of steps, as some steps may occur in different orders, some concurrently with other steps apart from that shown and described herein. In addition, not all illustrated steps may be required to implement a methodology in accordance with the present technology. Moreover, it will be appreciated that the processes may be implemented in association with the apparatus and systems illustrated and described herein as well as in association with other systems not illustrated.

The invention claimed is:

1. A gas cooktop comprising:
   a gas burner;
   a sensor configured to sense temperature of a cooking container heated by the gas burner;
   a valve configured to control flow rate of gas from a gas source to the gas burner; and
   a control system including circuitry, the control system configured to:
      start operation of the gas burner;
      receive sensor signals from the sensor indicating the temperature of the cooking container; and
      based on received sensor signals representing the sensed temperature of the cooking container and a cooking profile indicating one or more durations and one or more temperatures, control the valve to change the gas flow rate to the gas burner,
   wherein the cooking profile identifies a first and a second temperature, a first duration for the first temperature, and a second duration for the second temperature.

2. The gas cooktop of claim 1, wherein controlling the valve includes:
   controlling the valve to increase the flow rate of the gas to the burner when a temperature defined by the cooking profile is higher than the temperature of the cooking container represented by the received sensor signals, and
   controlling the valve to decrease the flow rate of the gas to the burner when the temperature defined by the cooking profile is lower than the temperature of the cooking container represented by the received sensor signals.

3. The gas cooktop of claim 1, wherein the valve is a proportional solenoid valve.

4. The gas cooktop of claim 1, wherein the control system is configured to control the valve to reduce the flow rate of gas to the burner when the received sensor signals correspond to a preset temperature at which the cooking container is scorched.

5. The gas cooktop of claim 1, further comprising an input controller comprising a knob, the input controller configured to set, based on a user controlling the knob, a surface temperature for the cooking container.

6. The gas cooktop of claim 5, wherein the knob includes a digital display configured to show a cooking container surface temperature determined by the control system based on the received sensor signals from the sensor, and/or the temperature set by the knob.

7. The gas cooktop of claim 1, wherein controlling the valve includes shutting off the valve when an end of the cooking profile is reached.

8. The gas cooktop of claim 1, wherein the control system comprises a processor and a voltage regulator coupled to the valve and the voltage regulator receives signals from a processor for controlling the valve.

9. The gas cooktop of claim 1, wherein the sensor includes a capillary tube and a thermal sensing device disposed at one end of the capillary tube.

10. The gas cooktop of claim 1, further comprising a grate disposed around the gas burner, wherein the cooking container is placed on the grate.

11. The gas cooktop of claim 10, wherein the sensor is coupled to the grate and extends above the gas burner.

12. The gas cooktop of claim 1, wherein the sensor is positioned above the gas burner.

13. The gas cooktop of claim 1, wherein an end of the sensor is centered on the burner and positioned above the gas burner.

14. The gas cooktop of claim 1, further comprising a communication device configured to communicate with a mobile device and/or a home automation system.

15. The gas cooktop of claim 14, wherein the control system is configured to receive the cooking profile from the mobile device and/or the home automation system.

16. The gas cooktop of claim 14, wherein the control system is configured to transmit, to the mobile device and/or the home automation system, progress of controlling the valve according to the cooking profile.

17. The gas cooktop of claim 1, further comprising a control panel, and the control system is further configured to define the one or more durations and the one or more temperatures based on user inputs received via the control panel.

18. A gas cooktop, comprising:
   a plurality of gas burners;
   a grate disposed above an upper portion of the plurality of gas burners;
   a plurality of temperature sensors, each temperature sensor disposed above a corresponding gas burner and configured to abut a bottom surface of a cooking container when the cooking container is placed on the grate above the corresponding gas burner;
   a plurality of proportional solenoid valves, each valve configured to control flow rate of gas from a gas source to the corresponding gas burner; and
   a control system including one or more processors, the control system configured to:
      receive user input specifying a cooking profile and assigning the cooking profile to a selected gas burner of the plurality of gas burners, the cooking profile including a first temperature, a first duration for the first temperature, a second temperature, and a second duration for the second temperature;
      while operation of the selected gas burner during the first duration and the second duration, receive, from the temperature sensor associated with the selected burner, sensor signals indicating a surface temperature of the cooking container heated by the selected gas burner;
      during the first duration, control the valve to increase the flow rate when the surface temperature of the cooking container is below the first temperature and decrease the flow rate when the surface temperature of the cooking container is above the first temperature; and
      during the second duration, control the valve to increase the flow rate when the surface temperature of the cooking container is below the second temperature and decrease the flow rate when the surface temperature of the cooking container is above the second temperature.

19. The gas cooktop of claim 18, wherein the control system is configured to receive, from a mobile device or home automation system, a cooking profile for one or more burners.

20. The gas cooktop of claim 1, wherein the control system is further configured to receive the cooking profile before the control circuitry starts operation of the gas burner.

\* \* \* \* \*